(12) United States Patent
Klinkigt et al.

(10) Patent No.: US 8,533,162 B2
(45) Date of Patent: Sep. 10, 2013

(54) METHOD FOR DETECTING OBJECT (75) Inventors: Martin Klinkigt, Sakai (JP); Koichi Kise, Sakai (JP); Heiko Maus, Kaiserslautern (DE); Andreas Dengel, Kaiserslautern (DE)

(73) Assignee: Osaka Prefecture University Public Corporation, Osaka (JP)

( * ) Notice: Subject to any disclaimer, the term of this patent is extended or adjusted under 35 U.S.C. 154(b) by 0 days.

(21) Appl. No.: 13/386,924

(22) PCT Filed: Aug. 16, 2010

(86) PCT No.: PCT/JP2010/063822
§ 371 (c)(1),
(2), (4) Date: Feb. 22, 2012

(87) PCT Pub. No.: WO2011/021605
PCT Pub. Date: Feb. 24, 2011

(65) Prior Publication Data
US 2012/0143856 A1    Jun. 7, 2012

(30) Foreign Application Priority Data
Aug. 18, 2009   (JP) .................................. 2009-189367

(51) Int. Cl.
G06F 17/30    (2006.01)
(52) U.S. Cl.
USPC ........... 707/669; 707/705; 707/687; 707/769; 707/758; 707/759; 707/748; 707/749; 382/190; 382/199; 382/253; 345/166; 706/14

(58) Field of Classification Search
USPC ................. 707/669, 705, 687, 769, 758, 748, 707/749; 382/253, 190, 199; 706/14; 345/166; 358/583
See application file for complete search history.

(56) References Cited

U.S. PATENT DOCUMENTS 5,983,237 A * 11/1999 Jain et al. ............................... 1/1
6,173,275 B1 * 1/2001 Caid et al. ........................ 706/14
(Continued)

OTHER PUBLICATIONS

International Search Report for corresponding International Application No. PCT/JP2010/063822 mailed Sep. 14, 2010.
(Continued)

*Primary Examiner* — Frantz Coby
(74) *Attorney, Agent, or Firm* — Renner, Otto, Boisselle & Sklar, LLP (57) ABSTRACT

An object detection method that is provided with a step for extracting a plurality of reference feature vectors related to a local area from an image representing an object, and extracting a plurality of query feature vectors related to the local area from a search query image; a step for matching each query feature vector against each reference feature vector, and calculating a similarity score having a value that is higher the closer the distance between both vectors, the larger the local area for which the query feature vector has been extracted, and the larger the local area for which a matching reference feature vector has been extracted; a step for determining a reference feature vector for which a similarity score is highest as the similar vector for each query feature vector; and a step for acquiring a final score by object associated with the similar vectors, and setting the object returning the highest score as the detection result; and wherein the score is calculated by dividing a sum of the similarity score for each similar vector by the number of feature vectors that have matched the object.

8 Claims, 5 Drawing Sheets

(56) References Cited

U.S. PATENT DOCUMENTS

| | | | |
|---|---|---|---|
| 6,760,714 B1* | 7/2004 | Caid et al. | 706/14 |
| 7,006,694 B1* | 2/2006 | Melikian et al. | 382/199 |
| 7,386,170 B2* | 6/2008 | Ronk et al. | 382/190 |
| 7,391,917 B2* | 6/2008 | Ohta et al. | 382/253 |
| 8,073,818 B2* | 12/2011 | Duan et al. | 707/687 |
| 2004/0223197 A1* | 11/2004 | Ohta et al. | 358/538 |
| 2004/0249774 A1* | 12/2004 | Caid et al. | 706/14 |
| 2005/0083304 A1* | 4/2005 | Wang et al. | 345/166 |
| 2006/0203912 A1* | 9/2006 | Kodama | 375/240.16 |
| 2007/0104362 A1* | 5/2007 | Hwang et al. | 382/159 |
| 2010/0088295 A1* | 4/2010 | Duan et al. | 707/705 |
| 2013/0159469 A1* | 6/2013 | Day et al. | 709/219 |

OTHER PUBLICATIONS

Fergus et al., "Object Class Recognition by Unsupervised Scale-Invariant Learning", Proceedings of IEEE Conference on Computer Vision and Pattern Recognition, vol. 2, pp. 264-271, Jun. 2003 (cited on p. 5, lines 9-12 of the specification).

Leibe et al., "Combined Object Categorization and Segmentation with an Implicit Shape Model", ECCV workshop on statistical learning in computer vision, pp. 17-32, 2004 (cited on p. 5, lines 13-16 of the specification).

Leibe et al., "Robust Object Detection with Interleaved Categorization and Segmentation", Int. J. Comput. Vision, 77(1-3): 259-289, 2008 (cited on p. 5, lines 17-19 of the specification).

Hondo et al., "Performance Evaluation of Local Features for Large-scale Image Recognition", Meeting on Image Recognition and Understanding (MIRU2008). The Institute of Electronics, Information and Communication Engineers.

Mori et al., "Efficient Shape Matching Using Shape Contexts", IEEE Transaction on Pattern Analysis and Machine Intelligence, vol. 27, 2005, p. 1832-1837.

* cited by examiner

METHOD FOR DETECTING OBJECT

BACKGROUND OF THE INVENTION

1. Field of the Invention

The present invention relates to a method of detecting an object in an image, and more particularly to a method of accurately detecting an object under a cluttered background.

2. Description of the Background Art

An object detection is a well-known task in computer vision addressing the problem to find an object in an image. In recent methods, information involved with an object is represented by a collection of local features. The local feature is a feature describing small regions of the image. The amount and quality of local features obtained from an image vary highly depending upon the used algorithms.

A common problem of the method of detecting an object is how to deal with local features extracted from a background. The background means a part of the image that does not belong to the object. The background may be the same for different objects. Therefore, if the local feature extracted from the background is used without being distinguished from the local feature extracted from the previous background, no reliable detection is possible. Accordingly, a system of not using the local features extracted from the background is demanded.

To solve this problem, many approaches employ supervised learning system. Specifically, three different approaches described below are proposed.

The first solution is to learn local features of an object from images, which do not contain any background at all. The image that does not contain any background at all can be achieved by segmenting the object from the background, for example. It is also possible to take images of the object with a background of one color, and this color is not used to extract information (Chroma key). These methods take much time and labor. Therefore, this solution can only be chosen if the amount of objects is small.

The second solution is to learn background by taking images, which do not show the object. With this method, one would know what local features from the background are extracted, and what local features from the object are extracted. However, this solution has a problem described below. For example, in an image showing a person, a bookshelf could be seen as a background. If one also wants to detect the bookshelf at the same time, the bookshelf could not be the background any more. In other words, the definition of the background depends upon what the object to be detected is. Therefore, this solution would not be correct.

The third solution is to use many images showing the object in front of different backgrounds. Only the local features that could be extracted from all images are assumed to belong to the object. The problem of this solution is that the amount of images needed for this approach is high, and must all be provided by the user.

Why the background clutter becomes a problem is that all local features extracted from an image are treated equally, regardless of the local features extracted from a background or extracted from an object. One of the methods for solving this problem is to manually distinguish the respective local features. However, this method is unrealistic, from the viewpoint of the number of local features. Another method is to use an image with no background in order to easily extract an object. There is also another method using images that contain various backgrounds for a single object.

Another problem arises from the Bag-of-Features strategy that is often used for an object recognition and object detection. In this strategy, clustering is executed to each local feature to obtain a representative vector (referred to as visual word), and one vector (feature) representing the feature of the object is generated from the obtained representative vector. The local features are only held as a collection of individual information without any correlation among them during the clustering. A stable feature that is effective for identification can be acquired by the "Bag-of-Features strategy". On the other hand, much information, such as the position, size, and direction of the local feature, is lost.

There are two models addressing this problem, the constellation model and the implicit shape model. The constellation model and the implicit shape model can be methods for compensating information, which is involved with the location of each local feature, and which is lost by the clustering process. How to treat the information is different between these two models. Each model will be described below.

<Constellation Model>

In the constellation model, local features extracted from an object are stored as positions in a two-dimensional probability space. To tell the conclusion first, the constellation model can be effective when a locations of a main visual word is not so different between a query image indicating an object to be detected and an image that should be detected by using the query image. In the constellation model, only a few features (normally around 5) are used to create the model in order to keep the resultant graph (the graph indicating local features as node, and indicating the location configuration of local features as edge) computable.

It could also be made scale invariant through normalization concerning one local feature.

As Fergus et al. have already pointed out, a weak point of this approach is to highly depend upon a feature detector (see, for example, Non-Patent Document 1). If it fails to detect these features defined over large regions of the image (e.g., the complete wheels of a bicycle), the results are not useful anymore. Another weak point is that this model is not rotation invariant, and cannot address viewpoint changes.

<Implicit Shape Model>

Leive et al. have proposed the implicit shape model (see, for example, Non-Patent Document 2). In this model, a shape is not represented by the relative location of visual words. For each visual word, its relative position to a predefined centroid point is used. During the detection, the visual words extracted from the query image are compared to visual words in an image database, and a possible centroid position is proposed. This is considered to be a voting to a possible object. These votes are agglomerated to find a possible object. Non-Patent Document 3 proposes a method of making this model scale invariant. This model is flexible enough to address the problems of a high intra-class variation of the object. This is achieved by sharing the local features of the object learned from different images.

CITATION LIST

Non-Patent Document

Non-Patent Document 1: R. Fergus, P. Perona, and A. Zisserman. Object class recognition by unsupervised scale-invariant learning. In Proceedings of the IEEE Conference on Computer Vision and Pattern Recognition, volume 2, pages 264-271, June 2003.

Non-Patent Document 2: B. Leibe, A. Leonardis, and B. Schiele. Combined object categorization and segmentation with an implicit shape model. In ECCV workshop on statistical learning in computer vision, pages 17-32, 2004.

Non-Patent Document 3: B. Leibe, A. Leonardis, and B. Schiele. Robust object detection with interleaved categorization and segmentation. Int. J. Comput. Vision, 77(1-3): 259-289, 2008.

SUMMARY OF THE INVENTION

Technical Problem

As described above, if the information about the correlation among local features can be considered, a stable local feature that is effective for identification can be acquired. However, the conventional constellation model is unsuitable for the object detection using many thousands local features. This model also has other drawbacks. On the other hand, the implicit shape model is more flexible. However, this model has a drawback of viewpoint changes, and is not stable against rotations of the image plane. A method of detecting an object that can employ location information of local features for eliminating the influence by the background has been demanded.

The present invention is accomplished in view of the foregoing circumstance, and aims to provide a method where an object can be learned from a few images with unlimited background regions, in ideal cases, from only one, and the object can be detected.

Solution to Problem

The characteristic of the present invention for solving the above-mentioned problem is that the invention uses not only local features, but also their local positions. As for a single local feature, a common local feature may possibly be extracted from another object or background by accident. However, the condition where many local features and their local positions match cannot accidentally occur. In the method according to the present invention, an object is detected by using the information described above.

An aspect of the present invention is a method of detecting an image representing an object from many image data stored beforehand, wherein the image data is stored with a plurality of reference feature vectors being related to, each reference feature vector representing one of local features in the stored image data, and with distances and orientations of respective reference feature vectors according to single reference point being related to, the method including a step of extracting a plurality of query feature vectors, each of which represents one of local features of a query image that represents an object, a step of comparing each query feature vector and each reference feature vector so as to determine the reference feature vector similar to the query feature vector as a similar vector; and a step of determining image data to be detected by using the distance and orientation from the reference point, the distance and the orientation being associated with the similar vector.

Another aspect of the present invention is that the method further includes the steps of: calculating locations of imaginary reference points according to each similar vector by using the distance and the orientation associated with the corresponding similar vector; casting a vote with an object ID for the locations; determining a plurality of clusters by collecting the similar vectors, which have imaginary reference points close to one another, i.e., which are similar to one another; obtaining a locality score, which represents a degree of similarity of each cluster; and using a predetermined number of object IDs as a result of the detection based upon the evaluation for the obtained locality score.

The voting process means a process of giving a score to any one of choices based upon the obtained proofs, and selecting the choice with the best or highest score as a result of gathering all proofs. This process is often used in this technical field in general.

Still another aspect of the present invention is that a similarity score, which is determined to have a greater value in case where the query feature vector and the reference feature vector are closer, in case where a local area from which the query feature vector is extracted is greater, and in case where a local area from which the reference feature vector is extracted is greater, is calculated in order to compare each of the query feature vectors and each of the reference feature vectors, the reference feature vector with the highest similarity score is determined as the similar vector of the query feature vector, and a predetermined number of object IDs are used as a result of the detection based upon the evaluation for each similarity score for each similarity score.

More specifically, the present invention provides a method of detecting an object through a retrieve of an image representing an object matched to an object represented by a query image from an image database that includes a plurality of reference images and is created by extracting a plurality of reference feature vectors from each reference image that represents an object, each of the reference feature vectors representing a feature of one of local areas in each reference image, and by storing the reference feature vectors in such a manner that each of the reference feature vectors is associated with the corresponding reference image and with an object ID that identifies the object represented by each reference image, the method comprising the steps of: extracting a plurality of vectors from the query image as query feature vectors, each of the query feature vectors representing a feature of one of local areas in the query image; comparing each query feature vector with each reference feature vector, and calculating a similarity score that is determined to have a greater value in case where the query feature vector and the reference feature vector are closer, in case where a local area from which the query feature vector is extracted is greater, and in case where a local area from which the reference feature vector is extracted is greater; determining a reference feature vector which provides the highest similarity score as a similar vector for each query feature vector; and obtaining resulting scores through a predetermined calculation procedure according to the respective object IDs, each object ID being associated with the similar vector, and determining, as a detection result, at least one object that is specified by an object ID giving the highest resulting score, wherein each resulting score is calculated according to the following equation:

[Equation 1]

$$s = \frac{\sum_f s_f}{N_f} \quad (1)$$

wherein $s_f$ is the similarity score regarding the similar vector, and $N_f$ is a number of query feature vectors each of which matches to a reference feature vector originated from a reference image representing an object regarding the object ID and being stored in the image database out of the query feature vectors in the query image.

Effect of the Invention

The method for detecting an object includes a step of calculating a similarity score that is determined to have a greater value in case where the query feature vector and the reference feature vector are closer, in case where a local area from which the query feature vector is extracted is greater, and in case where a local area from which the reference feature vector is extracted is greater, and a step of determining an object of an object ID providing the highest score as the result of the detection. Therefore, the method of the present invention can reduce the influence caused by the feature vector obtained from the cluttered background, and the object can be detected with emphasis on the feature vector detected from the object, compared to the case where the scale of the local area from which the feature vector is extracted is not considered. This is because the method of the present invention utilizes a characteristic described below. Specifically, as for a feature vector from the cluttered background, the scale of the local area from which the feature vector is extracted is generally small, while the scale of the local area from which the feature vector is extracted is relatively large as for the feature vector extracted from an object.

Even by obtaining the resulting score with the simple calculation described above, an object can be effectively detected. Specifically, compared to the conventional method that does not consider the scale of the local area, the method of the present invention can reduce the influence caused by the feature vector obtained from the cluttered background, and the object can be detected with emphasis on the feature vector detected from the object.

In the present invention, a known SIFT (Scale-Invariant Feature Transform) is applicable as a method of extracting feature vectors representing local features from an image. The detail of SIFT will be described later. In the present embodiment, feature vectors are extracted according to a PCA-SIFT that is one type of SIFT, but the invention is not limited thereto. As described above, the present invention utilizes a characteristic that a feature vector extracted from a cluttered background generally has a small local area. Therefore, it is extremely preferable to use a method satisfying this characteristic in the present invention. SIFT and PCA-SIFT are preferable examples of this type of method.

DESCRIPTION OF THE PREFERRED EMBODIMENTS

Preferable embodiments of the present invention will be described below.

The similarity score may be calculated according to the following equation:

[Equation 2]

$$s_f = \frac{w(f_q) \cdot w(f_d)}{d(f_q, f_d)} \quad (2)$$

wherein $w(f)$ is a size of a local area from which a feature vector $f$ is extracted, and $d(f_q, f_d)$ is the Euclidean distance between a query feature vector $f_q$ and a similar vector $f_d$ corresponding to the query feature vector $f_q$.

With this process, the similarity score $s_f$ has a greater value not only in case where the query feature vector and the reference feature vector are closer, but also in case where a local area from which the query feature vector and the reference feature vector are extracted is greater. Therefore, the similar vector can be determined by considering the scale of the local area from which the query feature vector and the reference feature vector are extracted, and an object as a result of the detection can be determined.

The image database may further store distances and orientations from a predetermined reference point with respect to respective stored images, the distances and orientations being associated with the corresponding reference feature vector extracted from the image, the method may further comprise the steps of: determining locations of imaginary reference points to the similar vectors for each similar vector by using the distance and orientation, which are stored as being associated with the corresponding reference feature vector; determining a plurality of clusters by collecting the similar vectors, which have imaginary reference points close to one another, and with which the same object ID is associated; and obtaining a locality score, which represents a degree of similarity of each cluster obtained as a result of the step of determining clusters, through a predetermined process, wherein each resulting score is calculated according to the following equation instead of the equation (1):

[Equation 3]

$$s = \frac{\sum s_f}{N_f} \sqrt{\frac{\sum r_c}{N_C}} \quad (3)$$

wherein $r_c$ is the locality score, and $Nc$ is a number of similar vectors belonging to each cluster.

An effective object detection can be done by using the similarity score and the locality score. Specifically, compared to the conventional method without consideration of the scale of the local area, the influence of the feature vector obtained from a cluttered background can be reduced, and the feature vector detected from the object is more emphasized. Under such condition, an object can be detected.

According to this aspect, when the query image and the image in the image database are compared by using the local features extracted from these images, the reference point and the information of the relative location to the reference point are used. With this process, they can be well compared, considering not only whether the number of the corresponding local features is only great or not, but also whether the relative locations of the local features, i.e., the location configurations of the local features in the image, are similar or not.

The image database stores images not only such that the images are associated with the reference feature vector, but also such that each reference feature vector is associated with the distance and orientation from the reference point. The imaginary reference point involved with the similar vector is calculated from the information about the distance and the orientation from the reference point, whereby the clustering is executed.

The reference point has a role equal to the centroid in the Non-Patent Documents 2 and 3, with respect to the reference point being a reference for expressing each local feature.

However, the reference point is not necessarily the centroid of an object. Further, the reference point does not have to be in the object. The reference point may only be a certain point in an image. More specifically, in a rectangle image area, the reference point may be an intersection (the center of the rectangle area) of two diagonal lines of the rectangle area.

The locality score $r_c$ may be defined as the total number of the imaginary reference points included in each cluster.

The method of the present invention may further compris the steps of: obtaining a shape context according to respective feature vectors by applying a procedure of a shape context that is defined as a histogram obtained by dividing a region around one feature vector into a plurality of sub-regions as bins, and counting a number of other feature vectors belonging to the respective bins, each of the other feature vectors being distributed around the feature vector, calculating a context score through a predetermined procedure by using the obtained shape context, and calculating the context score according to the query feature vector by applying the shape context to each query feature vector, wherein each resulting score is calculated according to the following equation instead of the equation (3):

[Equation 4]

$$s = \frac{\sum s_f}{N_f} \sqrt{\frac{\sum r_C}{N_C}} \sqrt{\sum u_{SC}} \qquad (4)$$

wherein $u_{sc}$ is the context score.

With this process, the resultant score can be obtained by using the similarity score, the locality score, and the context score, whereby the object as a result of the detection can be determined. Therefore, the influence of the feature vector obtained from a clustered background can be reduced, and the feature vector detected from the object is more emphasized. Under such condition, an object can be detected. Specifically, the image corresponding to the query image can be found, considering whether the location configurations of the local features around the local feature are similar or not from the viewpoint of the context score that is different from the locality score. Whether they are put into the same bin or not can be used to evaluate whether the location configurations of points are similar or not.

The context score may be defined as a length of a vector by coupling elements of respective representative vectors,

[Equation 6]

$$SC = \begin{pmatrix} v_{ix} \\ v_{iy} \\ \vdots \\ v_{mx} \\ v_{my} \end{pmatrix} \qquad (6)$$

wherein the representative vector of each bin is determined by obtaining the sum of neighboring feature vectors, belonging to any one of the bins, for each bin.

[Equation 5]

$$v_i = (v_{ix}, v_{iy}) \qquad (5)$$

wherein m is defined as the number of bins in the shape context.

When the feature vector at the center of the shape context is located in the vicinity of a border line of an object, the feature vectors around the feature vector at the center tend to show a common direction, in general. On the other hand, when the feature vector at the center is located on a cluttered background, the directions of the feature vectors around the feature vector at the center are not fixed. From this characteristic, a greater context score can be obtained in case where the target feature vector is located in the vicinity of the border line of the object, than in case where the target feature vector is located on the cluttered background. Accordingly, when this context score is used in the clustering step or the step of determining the result of the detection, the object can be detected under the condition such that influence of the feature vector obtained from a cluttered background can be reduced, and the feature vector detected from the object is more emphasized.

$N_f$, $r_c$, and $N_c$ will be described using examples. It is supposed that clusters of three classes, i.e., first to third classes, are obtained through the clustering. Nc is the total number of clusters, so that $N_c=3$.

$r_c$ represents a number of imaginary reference points for one cluster. For example, it is supposed that the first cluster has three imaginary reference points. For the first cluster, $r_c=3$. The second cluster is supposed to have two imaginary reference points, so that $r_c=2$ for the second cluster. The third cluster is supposed to have one imaginary reference point, so that $r_c=1$ for the third cluster. Accordingly, the total of the imaginary reference points for these clusters is $\Sigma r_c=6$. If the clustering is not well done, many clusters, each including a small amount of imaginary reference points, are obtained. Accordingly, the value of $\Sigma(r_c/N_c)$ becomes close to 1. On the other hand, if the clustering is well done, a few clusters, each including many imaginary reference points, are obtained. Therefore, the value of $\Sigma(r_c/N_c)$ is larger than 1.

$N_f$ is a number of the feature vectors, which are matched to the feature vector regarding the object stored in the image database, of the query image. For example, the feature vectors extracted from the background involved with none of the objects are neglected. Specifically, it is supposed that 1000 feature vectors are extracted from the query image, 750 vectors are matched to an object A, and 600 vectors are matched to an object B. In this case, $N_f=750$ for the object A, and $N_f=600$ for the object B.

Various preferable embodiments described here can be combined to one another, except for an alternative one.

The present invention will be described in more detail with reference to the drawings. The description below is only illustrative, and should not be construed to limit the present invention.

Figure 1:
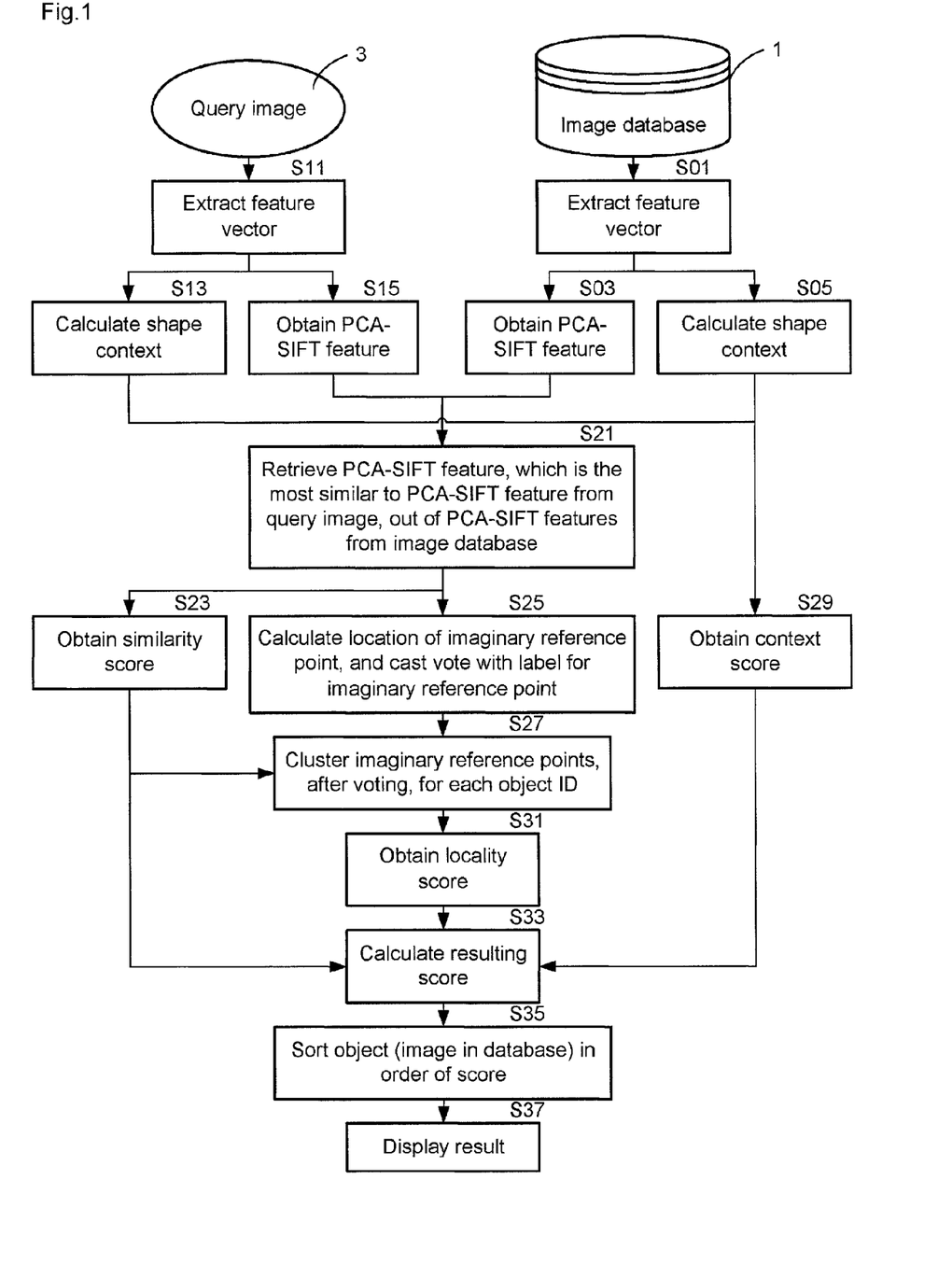
FIG. 1 is a flowchart illustrating a process flow of a method of detecting an object according to the present invention.

The method according to the present invention is composed of different ideas which address different problems. FIG. 1 illustrates an outline of the process.

In the method according to the present invention, PCA-SIFT features and a shape context are extracted from the image, which are to be stored in the image database 1, and from a query image 3 serving as a query (see steps S01, S03, S05, S11, S13, and S15), so as to represent an image.

In the first step involved with the object detection, the PCA-SIFT features (see steps S11 and S13) extracted from the query image 3 and the PCA-SIFT features (see steps S01 and S03) involved with each image stored in the image database 1 are compared, and a similarity score is calculated (similarity processing, see steps S21 and S23 in FIG. 1). The PCA-SIFT features of each image in the image database 1 are extracted from each image during the storage to the image database 1 (see steps S01 and S03). In the similarity processing, the locations of the imaginary reference points are also calculated based upon a "reference point", which is proposed as one characteristic of the present invention (see step S25 in FIG. 1).

In the second step, a context score is calculated from the shape context (see steps S05, S15, and S29). The values of the similarity score and the imaginary "reference point" obtained in the first step (see step S25), and the value of the context score obtained in the second step (see step S29) are used for the clustering step (see step S27 in FIG. 1) in the third step so as to calculate a locality score (see step S31 in FIG. 1). In the fourth step, the resultant score is calculated from the similarity score of the PCA-SIFT feature, the context score, and the locality score (see step S33 in FIG. 1).

First, how to score the local features individually will be explained, and then, the clustering of the imaginary reference point will be described. Finally, the shape context will be described.

1.1 Distance and Individual Scoring (Similarity Score)

Our chosen feature is SIFT as a local feature for describing an image. SIFT is a method of extracting a local feature proposed by Lowe (see D. G. Lowe. Object recognition from local scale-invariant features. In ICCV '99: Proceedings of the International Conference Computer Vision-Volume 2, page 1150, Washington, D.C., USA, 1999. IEEE Computer Society.). One local feature is represented by vector of dimensions of 128 (feature vector). It has been known that the local feature obtained by this method is highly discriminated, and exhibits excellent performance. For a faster computation rate, the PCA-SIFT using the original vector of dimensions of 128, which are reduced with the help of PCA (principal component analysis), has been known. In the present embodiment, the PCA-SIFT vector of dimensions of 36 is used. It has been known that the accuracy also increases by using the PCA-SIFT (e.g., see Y. K. Rahul. Y. Ke, and R. Sukthankar. Pca-sift: A more distinctive representation for local image descriptors. pages 506-513, 2004.). One benefit of the local features obtained by SIFT and PCA-SIFT is that they are represented as the feature vector, and they provide a scale and an orientation of a local area. The scale and the orientation of the local area do not directly correspond to the amount of the feature vector, i.e., norm (length) and orientation of the feature vector. Specifically, they indicate the scale and the orientation of the local area from which the local features are extracted, different from the amount of the feature vector.

By using the scale of the local area, we can address the problem of cluttered background. The local features created from the cluttered background are normally of smaller scale, while the local features created from the object are of relatively larger, in most cases. This is only an approximation, and does not always hold. For example, if the object itself is a fine texture, the local features obtained from the object has a small local area.

The method according to the present invention will be described below.

It is supposed here that w(f) indicates the scale of the PCA-SIFT feature f, and $d(f_1, f_2)$ indicates the Euclidean distance between two local features $f_1$ and $f_2$. $f_q$ and $f_d$ respectively indicate the local feature obtained from the query image 3, and the local feature obtained from the image. In this case, the similarity score $s_f$ between one local feature extracted from the query image 3 and one local feature extracted from a certain image in the image database 1 is defined as follows (see steps S21 and S23).

[Equation 7]

$$s_f = \frac{w(f_q) \cdot w(f_d)}{d(f_q, f_d)} \quad (7)$$

According to the definition of the equation (7), the similarity score $s_f$ has a greater value in case where the query feature vector and the reference feature vector are closer, and in case where respective local areas from which the query feature vector and the reference feature vector are extracted are greater.

In this stage, we are judging the local features individually, and the local feature with the highest score is selected as the match result.

1.2 Local Information

In this section, how to use the PCA-SIFT features for obtaining the local feature will be described. Every local feature has a location in the image plane. If only this information is directly used, the resultant model would be similar to the conventional constellation model. This representation is too inflexible, and the information that must be compared during detection would increase exponentially for every feature. Instead, the local information according to the present invention is comparable to the implicit shape model.

The way to handle the local features in the present invention is based upon the concept described below.

Firstly, one reference point is located in an image. The reference point is basically located on any positions. However, in order to reduce the influence by the calculation error, the reference point is preferably located on the centroid of an object (or on the center of the image).

When the local feature is recorded, not only the scale and orientation of the local feature itself but also the relative location to the reference point, i.e., distance t and angle α, are further recorded. Since the information of the relative location to the reference point is recorded, the relative location of the local feature can be considered, when the query image and the image in the image database are compared.

For example, it is supposed that a local feature A1 of the query image is associated with a local feature B1 in the image database. When the scale and orientation of the local feature B1 are matched to the scale and orientation of the local feature A1, the location of the reference point to the local feature B1 is also transformed. When this process is executed for each local feature in the query image, the converted reference points can be obtained in the number corresponding to the number of the local features, associated with each local feature in the query image, in the image database. If the association of the local feature is correct, and the local feature is associated with the same object, the converted reference points should represent the same point. Specifically, the reference points must be concentrated on one point in the query image. The locality score is obtained based upon the concept described above. The detail will be described below.

1.2.1 Voting Using Reference Point

Figure 2:
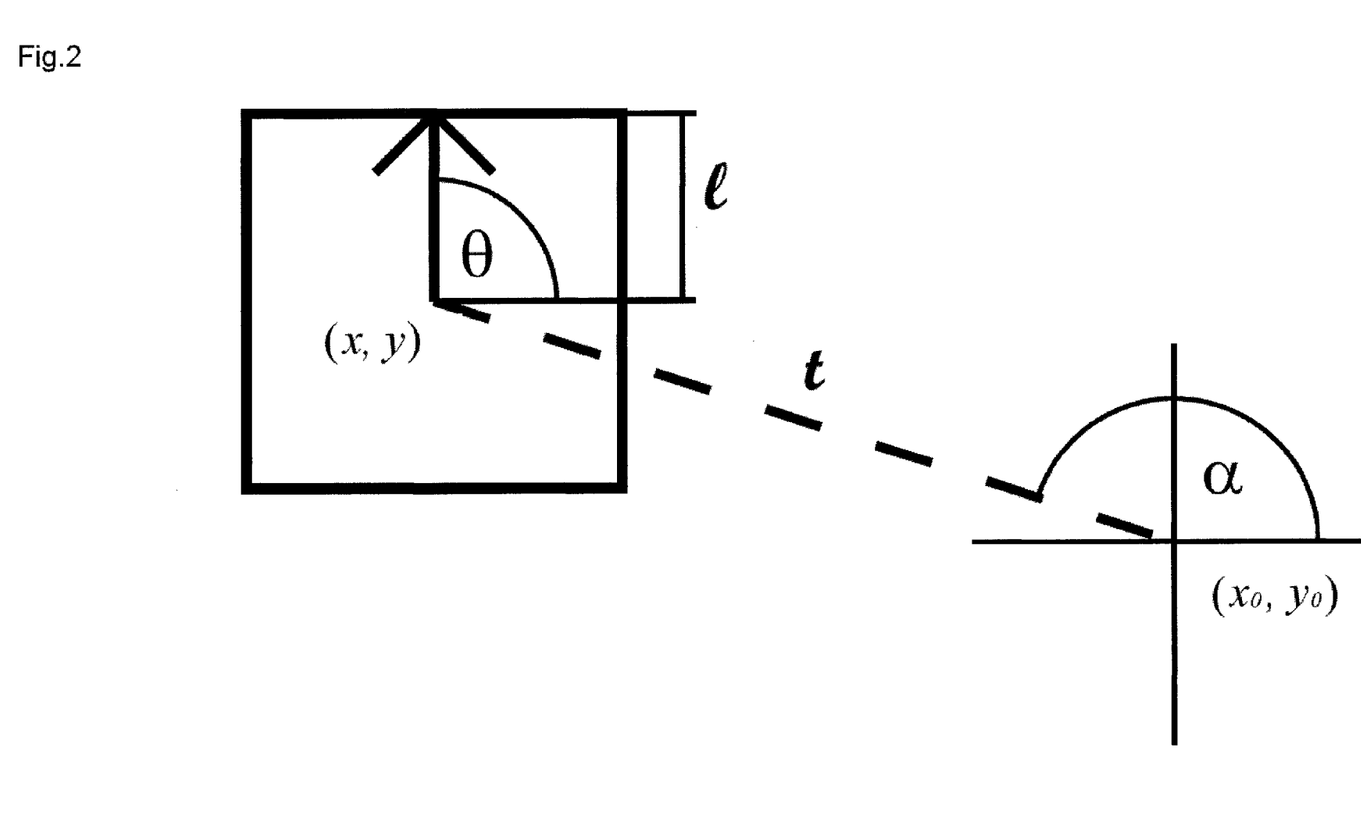
FIG. 2 is an explanatory view describing a definition of a distance t and an angle α from a reference point of a local feature according to the present invention.

During the time of learning, specifically, during the time of storing each image into the image database 1 beforehand, a distance t and an angle α to the reference point are calculated for every local feature extracted from the image to be stored, and they are stored as being associated with the image as illustrated in FIG. 2.

The meaning of FIG. 2 will be described below. An area of a local feature represented as a rectangle (center (x, y), scale 1, orientation θ) is located on the position with the distance t and the angle α to the reference point $(x_0, y_0)$. On the other hand, if the local feature is given, and the coordinate, the scale, and the orientation are (x, y), 1, and θ, respectively, an imaginary reference point is present on the position determined by these values, t, and α.

The voting process in step S25 in FIG. 1 will be described in more detail. The local feature with the highest score, which is determined by the equation (7), is obtained from the image database 1 for the local features obtained from the query image 3. The local feature is obtained from the image, whose distance t and angle α to the reference point are calculated during the time of learning, and which is stored in the image database 1, as described above.

An ID of the object in the image is supposed to be i. The position, scale, and orientation of the local feature obtained from the query image 3 are defined as (x', y'), 1', and θ'. The scale, and orientation of the local feature, compared with the local feature from the query image 3, in the image database 1 are defined as 1 and θ, and the angle and the distance to the reference point are defined as α and t. In the coordinate system of the query image, the location on which the imaginary reference point $(x_0', y_0')$ is present is:

[Equation 8]

$$(x_0', y_0') = \left(x' - \frac{l'}{l} t \cdot \cos(\alpha - \theta + \theta'), y' - \frac{l'}{l} t \cdot \sin(\alpha - \theta + \theta')\right) \quad (8)$$

The imaginary reference point $(x_0', y_0')$ in the two-dimensional plane is voted. Specifically, we store a vote with a label i involved with the object ID on the coordinate of the imaginary reference point $(x_0', y_0')$. After we have the votes from all features, a clustering is needed in the two-dimensional plane as described later (see step S27 in FIG. 1). It is not expectable that all votes, i.e., the imaginary reference points, perfectly match in only one point.

If the query image 3 includes the same object i in the image database 1, the votes for the object i are expected to be concentrated on the imaginary reference point. On the other hand, if the votes for the object i to the imaginary reference point exceed a fixed number, the object i is to be present in the query image 3. Some of the local features from the cluttered background may erroneously be matched to the local features of an unrelated image in the image database 1. However, a series of accidents is needed in order that the votes from the accidental matching result are concentrated on the imaginary reference point. The probability of this is extremely low.

It is actually rare that the votes are correctly concentrated on the imaginary reference point due to various errors, and the votes are dispersed around the imaginary reference point. Therefore, the clustering process (see steps27) described below is needed to collect votes and make a comparison.

1.2.2 Clustering and Locality Score

The clustering is always applied to agglomerate points in a given space. For this task, two major functions are needed. One is to estimate the similarity (or distance), and the other is to generate a new cluster out of two given clusters. If these functions are defined, the clustering algorithm can be used to find dense regions.

In the present invention, the method that Liebe et al. have already used in the Non-Patent Document 3 is used to cluster possible votes. The main idea is to create reciprocal nearest neighbor (RNN) pairs in random start points, to store them in a sorted list, and to cluster them after the similarity is beyond a given threshold. Attention should be paid on the point that the votes, which are to be clustered, hold a label of the object ID. In the present invention, only the votes with the same label are clustered. There is no chance that the votes with different label belong to the same cluster, even though they are close to each other.

In the framework of the present invention, the behavior of the clustering process is changed as described below. The goal is to achieve that proposed points from features with better similarity can cluster more easily. Therefore, every cluster can hold a clustering value ζ. This clustering value is attractive force, and if it is high, the clusters can easily be formed, can be farther away from each other, and would be in one resultant cluster. For small values, the clustering will become nearly impossible.

After the clustering, we calculate a score for every cluster as the locality score $r_c$ by using the number of clusters in the cluster (see step S31 in FIG. 1). The more votes are in one cluster, the better the locality for this object is. Clusters which only contain one vote are discarded.

The process described above is somewhat similar to the implicit shape model by Leibe et al in the Non-Patent Documents 2 and 3. The great difference is that, although the method according to the present invention is invariant to similarity transformation including rotation, the method in Liebe et al is not rotation invariant. The method of the present invention uses local features themselves. On the other hand, the Liebe method does not use the local features themselves, but converts the local features into a representative vector called visual word.

1.2.3 Shape Context and Context Score

The idea of a voting using the imaginary reference point leads already to a remarkable improvement. However, it should be noted that, in this process, information involved with relative locations among local features is missing. Specifically, the locality score defines the relative locations between the reference point and the local features, and does not define the relative locations among the local features. If so, each of different objects may have a similar locality score.

It is preferable to use a method of the shape context as a method of overcoming the problem above. A context score, which is a further evaluation index, can be applied based upon the shape context. The context score use evaluates whether the locations of the local features around a target local feature are similar to one another or not. Specifically, the context score use evaluates not only the relative location configuration between the reference point and the local features, but also the similarity of the location configurations of the local features around the target local feature.

The shape context holds information about the location, but is not directly comparable to the constellation or implicit shape model. The shape context does not score concrete locality information of the points. The points of a local neighborhood are put into sub-regions (bins), and locality is expressed by using the number of points in the bins. The number of features in each bin is used to create a histogram which describes the local configuration of the points. This type of representation approximates the absolute location information of points belonging to bins.

It can be evaluated whether the local configuration of points is the same or not by checking whether the points are put into the same bin or not. This method is robust for a small variation of a location of each point, compared to the method of directly evaluating the relative location of each point. Therefore, this type of representation is very flexible. Belongie et al. used this method to detect shapes where the features itself were just represented by points on the shape (e.g., see S. Belongie, J. Malik, and J. Puzicha. Shape matching and object recognition using shape contexts. IEEE Trans. Pattern Anal. Mach. Intell., 24(4): 509-522, 2002).

The shape context is a high restriction. The shape context is weak to a so-called "disturbance". For example, when many local features, obtained from a background and unrelated to the target object, are put into a region of the shape context, they cannot correctly be compared. Too large region of one bin leads to unfavorable result. In other words, the condition where the shape contexts are "the same" cannot be required for the large region. Therefore, it is necessary to apply the shape context with a limited area being defined as one bin.

The main local feature of the shape context has its scale, and orientation. The same shape context can be obtained by allowing the scale and orientation of a sectoral region of the shape context to match to the scale and orientation of the local feature, so long as the scale and orientation of the local feature are stable. In this manner, the region of the shape context that is invariant rotation and invariant scale can be obtained. Therefore, the shape context in the query image and the shape context in the image database can be compared.

By adopting the sectroal shape, the shape context can easily be made rotation invariant.

Figure 3:
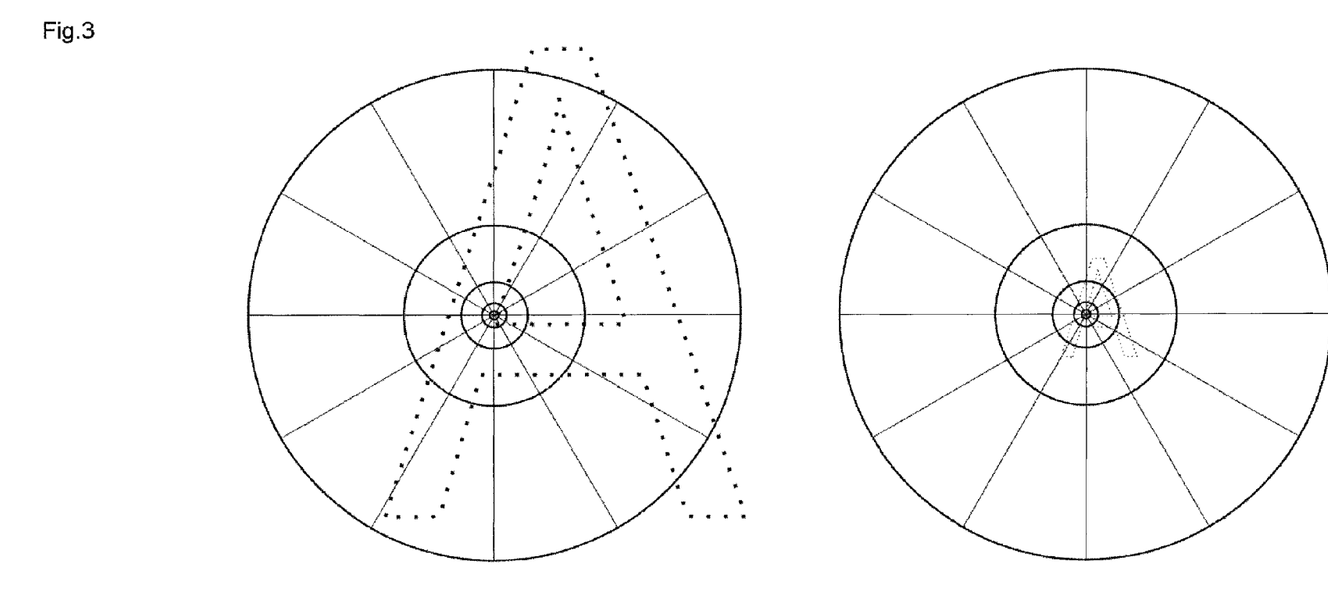
FIG. 3 is an explanatory view illustrating one example of a shape context according to the present invention.

On the other hand, the scale is a critical point. FIG. 3 illustrates an example of the shape context. The segmented spaces in FIG. 3 represent the respective bins in FIG. 3. FIG. 3 illustrates two shape contexts, each having a different scale. The left view illustrates the case where the shape context has an appropriate scale, and many features belong to different bins. On the other hand, the right view illustrates the case where almost all points are put into an inner circle, and therefore, the number of bins to which points belong is small. Accordingly, in this case, it is difficult to distinguish this shape context from another shape. As described above, the shape context varies greatly depending upon the scale. Therefore, during the time of learning and detection, appropriate shape contexts have to be extracted from the query image and from the images in the image database in order that the images with the same scale must be compared.

In the method according to the present invention, we calculate the shape context for every PCA-SIFT feature (see steps S05 and S13). The points in FIG. 3 become local areas representing the PCA-SIFT features. The location, scale, and orientation of the PCA-SIFT feature are only used, and the information of descriptor (feature vector with 36 dimensions) is not used to calculate the shape context. Further, the extended shape context proposed by Mori et al is used (see Mori, Greg and Belongie, Serge and Malik, Jitendra. Efficient shape matching using shape contexts. IEEE Trans. Pattern Anal. Mach. Intell., 27(11): 1832-1837, 2005). In this model, not feature points but normalized vectors are put into each bin. A representative vector for the bin is obtained from a sum of vectors put into the bin. We use a unit vector indicating the orientation of the local feature as the normalized vector.

Figure 4:
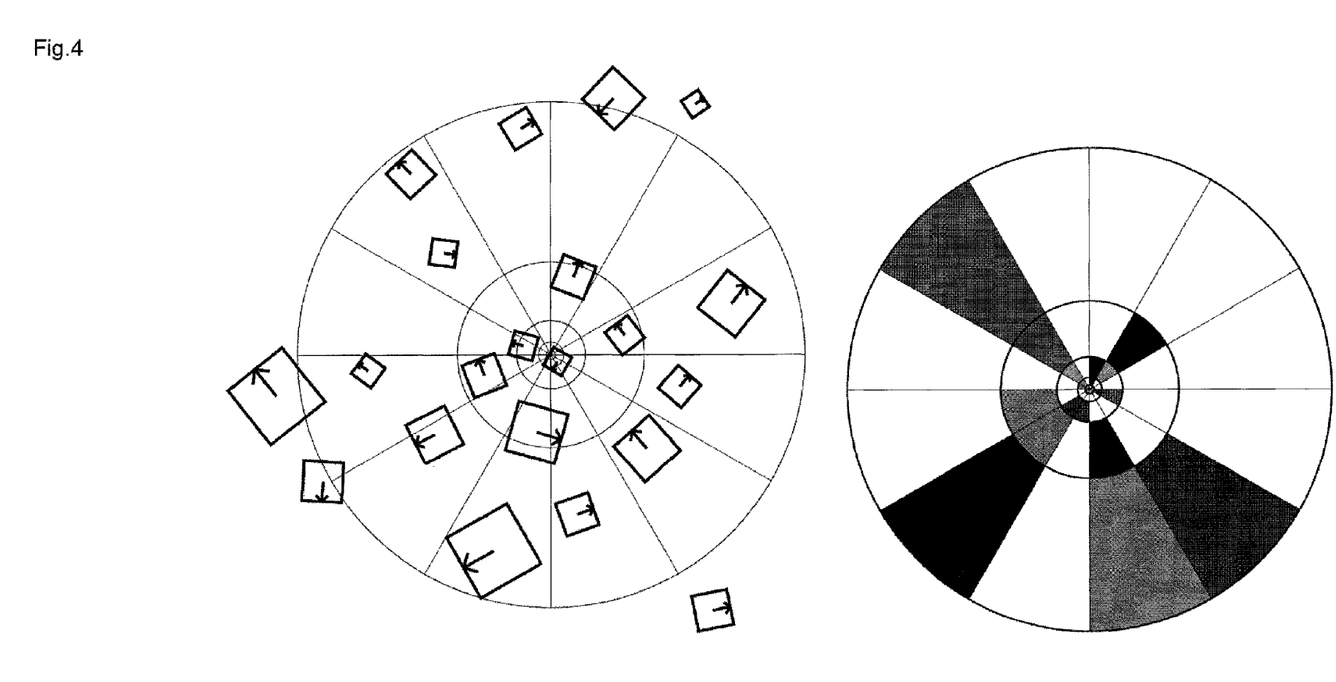
FIG. 4 is an explanatory view describing a relationship between local features and the shape context according to the present invention.

FIG. 4(a) illustrates the local areas and their shape contexts of the PCA-SIFT features distributed into an image plane. Some local areas are outside the shape context. Therefore, these features are not used. Here, the scale information of the local area is used. We weighs the normalized vector by using the scale information of the local area.

[Equation 9]

$$(n_{1_x}, n_{1_y})^T \ldots (n_{i_x}, n_{i_y})^T \qquad (9)$$

The normalized vector (representing the orientation of the local feature: norm of the vector is normalized to 1) for the local features $f_1, \ldots, f_i$ is represented by [Equation 9], and $w(f)$ represents the scale of the local area of the local feature $f$. The representative vector $v$ for the bin is represented as:

[Equation 10]

$$v = \sum_{s=1}^{i} w(f_s) \cdot \begin{pmatrix} n_{s_x} \\ n_{s_y} \end{pmatrix} \qquad (10)$$

If the bin is located over a well-defined border of the object, the shape contexts have a common direction. On the other hand, local features extracted from the cluttered background are erased by the sum, because they tend to have no preferred direction. Therefore, the representative vector of the bin becomes almost zero.

As described above, the method of obtaining the shape context, which is rotation invariant and scale invariant, is realized. From the feature for which we calculate the shape context, the orientation of the local feature is used to adjust the rotation. The scale is adjusted by using the scale of the local area. Specifically, the radius of the outer circle of the shape context is 100 times the scale 1 of the local feature illustrated in FIG. 2.

The computation of the shape context is made as described below for the local features extracted from the query image. FIG. 4(b) illustrates an example of a histogram obtained as a value of the shape context. The histogram is supposed to be a vector SC. When m represents the number of bins in the shape context, a vector v determined according to the equation (10) is calculated for every bin. The vector SC is therefore represented as:

[Equation 11]

$$SC = (v_{1_x}, v_{1_y}, \ldots v_{m_x}, v_{m_y})^T \qquad (11)$$

The length of the vector SC is represented by use, and this is used as a context score of the shape context.

As described above, the context score SC is specified as the length of a certain local feature, i.e., the length of the vector formed by coupling the respective representative vectors, each being representative of each of plural bins located around a start of the feature vector. As described above, the representative vector located around the border line of the object becomes longer, and the representative vector of the bin located on the cluttered background becomes nearly zero. The index indicating whether the local feature extracted from the query image is obtained from the cluttered background or not is given according to the general characteristic described above.

1.3 Resulting Score

The most important point in the present invention is how to determine the above-mentioned clustering value ζ. The clustering value is determined in the manner described below in the present embodiment. It is supposed that $s_f$ is a similarity score (see section 1.1) obtained through the comparison of PCA-SIFT features, and $d(SC_1, SC_2)$ represents the distance of two shape contexts measured by the Euclidean distance of two histogram vectors (Equation (11)). It is also supposed that $SC_q$ represents the shape context from the query image 3, and $SC_d$ represents the shape context from the image in the image database 1. In this case, the clustering value ζ is defined as:

[Equation 12]

$$\zeta = s_f \frac{\sqrt{t} \cdot u_{SC}}{d(SC_q, SC_d)} \qquad (12)$$

by using the similarity score $s_f$ and the context score $u_{sc}$. The multiplication with √t has only technical reasons with respect to the increasing uncertainty for higher distances of the feature to its imaginary reference point.

Three ways are considered as the resulting score s in the present invention. The first way is to use only the similarity score. In this case, the resulting score s determined to one object is calculated as:

[Equation 13]

$$s = \frac{\sum s_f}{N_f} \quad (13)$$

The second way for the resulting score s is to use both the similarity score and the locality score. In this case, the score s is calculated as:

[Equation 14]

$$s = \frac{\sum s_f}{N_f} \sqrt{\frac{\sum r_C}{N_C}} \quad (14)$$

The third way is to use the similarity score $s_f$ (see the equation (7)), the locality score $r_c$, and the context score $u_{sc}$ so as to obtain the resulting score s (see step S33 in FIG. 1). If $r_c$ is the locality score resulting from the clustering of the imaginary reference points, the resulting score s determined for one object is calculated as:

[Equation 15]

$$s = \frac{\sum s_f}{N_f} \sqrt{\frac{\sum r_C}{N_C}} \sqrt{\sum u_{SC}} \quad (15)$$

The score s is applied through the process described below.

Firstly, the reference feature vector and the query feature vector are compared, and the reference feature vector that is the closest to the query feature vector is obtained. It is to be noted that, since the proposed method employs the approximate nearest neighbor search in order to deal with enormous reference feature vectors, whether the determined one is the true closest one or not cannot be secured.

The score s is then determined by using the equation (15) for the comparison result. Here, w( ) used for the calculation of the similarity score $s_f$ is a value proportional to the scale of the region (length of one side of a square) from which the reference feature vector or the query feature vector is extracted.

According to the process described above, more flexible process is possible than in the conventional WTA, which is compared to the present method in a later-described experimental example. In the WTA, the votes casted for the nearest neighbor search all have the same weight. On the other hand, in the present invention, the votes according to the weight can be given.

The similarity scores $s_f$ in the equations (13), (14), and (15) are calculated between the PCA-SIFT features from the query image 3 and the PCA-SIFT features obtained from the image database 1 (see Section 1.1). $\Sigma s_f$ is a sum of the scores $s_f$ involved with the same object ID. $N_f$ is the number (the number of votes obtained for the object whose score s is to be obtained) of feature vectors used for the comparison for the object, which is to be currently detected, out of the PCA-SIFT features used for the comparison.

The locality score $r_c$ is defined as follows. Specifically, pairs of the PCA-SIFT features from the query image 3 and the PCA-SIFT features with the highest similarity score sf from the image database 1 are obtained. A voting with a label of an object ID is made for the imaginary reference point for the obtained PCA-SIFT feature. The clustering process is done for the votes having the same label so as to determine the cluster. The locality score $r_c$ is specified as the number of votes obtained for each of determined clusters (see Section 1.2.2).

$\Sigma r_c$ is a sum of the locality scores $r_c$ for the same object ID. $N_c$ is the number of clusters for the imaginary reference point to this object. The context score use has a greater value when the local feature is located around the border line of the object, and has a smaller value when the local feature is located on the cluttered background. $\Sigma u_{sc}$ is the sum of the scores $u_{sc}$ for the same object ID. The term involved with $S_f$ is normalized with $N_f$, and the term involved with $r_c$ is normalized with $N_c$. With this process, the adverse influence, which is caused when the query image 3 contains many local features of small regions, is eliminated. Taking the root is for reducing the influence of values, and this is not essential.

Finally, any one of the ways in the equations (13), (14), and (15) is used as the resulting score. The images in the database, i.e., the objects, are arranged in the descending order of the final score (see step S35 in FIG. 1), and the objects on top places are outputted as the result of recognition (see step S37 in FIG. 1).

2. Experimental Results

In the evaluation scenario, we consider a use case where a normal, non-professional user uses the system according to the present invention. Since a normal user uses this system, we can assume none of the cases, which are that the object is segmented from the background, and has a defined size or location in the images, and that the images are of a high quality. All the mentioned requirements for the images assumed in the conventional techniques are not established.

In this experiment, the proposed system and a simple Winner-Take-All (WTA) approach are compared. In the WTA approach, local features from the query image 3 are compared to local features, which are the most similar to the local features from the query image 3, in the image database 1, and the object with the local features gets one vote. The object that "gets" the highest votes is the winner, and is outputted as the result of the recognition. It is to be noted that any information about the local configuration is not used at all. The present experiment is carried out only when the query image 3 contains an object stored in the image database 1, and is not carried out when the query image 3 contains none of the objects in the image database 1.

Since the user will normally review the results, it is considered that it is enough the correct result places high. Accordingly, in the experiment, we do not ask for a perfect $1^{st}$ match, but ask for the case where the correct result falls within the first top ten. If the correct result falls at the eleventh or subsequent ranks, the result will not be reviewed by a user, and this result is regarded as a failure.

Figure 5:
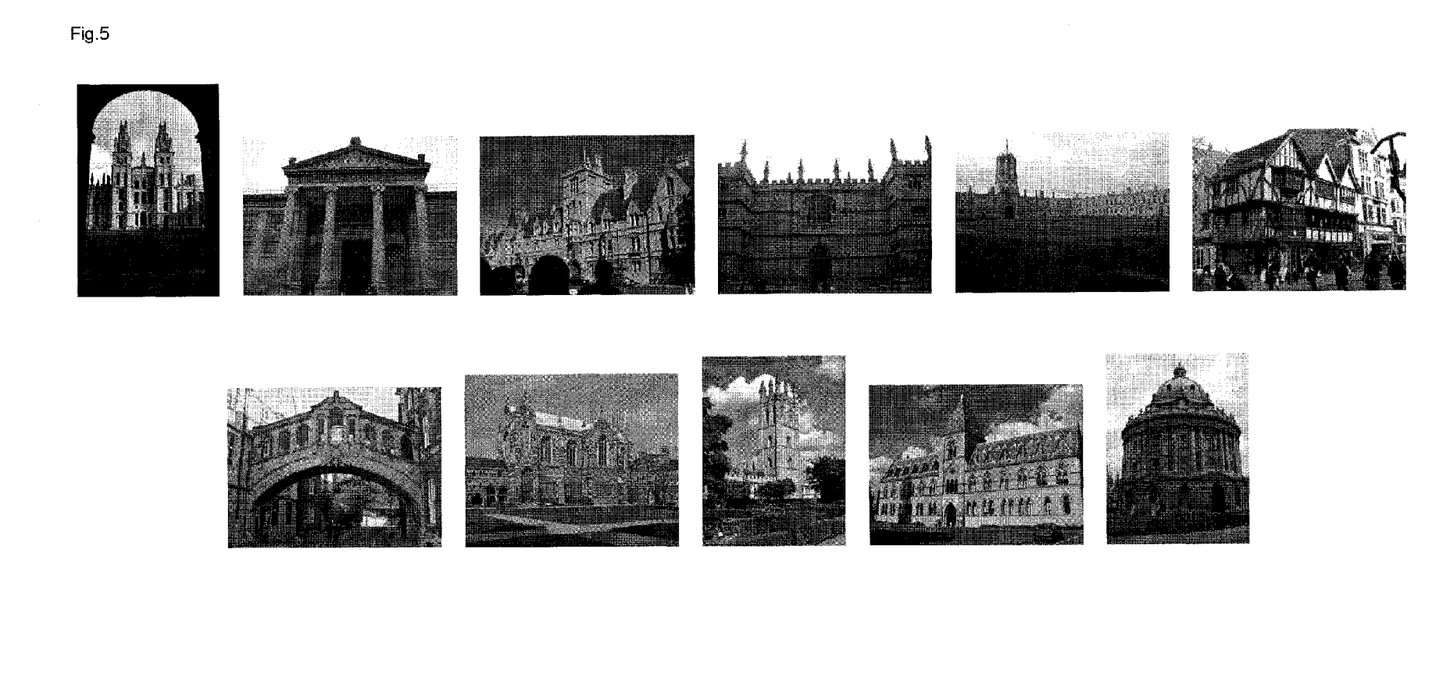
FIG. 5 is an explanatory view illustrating an example of images used for an experiment for confirming effectiveness of the present invention.

The experiment was done with the Oxford buildings dataset (Internet, <URL: http://www.robots.ox.ac.uk/~vgg/data/oxbuildings.>). FIG. 5 illustrates examples of images. These images are dataset of images of buildings captured by a normal user collected from private Flicker images. Therefore, the dataset perfectly suits our use case. This dataset contains a variety of images from 11 objects (buildings). The number of the object in the image is always only one. In the experiment, these images were used as the query images 3.

For the construction of (for learning) the image database 1, we took images from Wikipedia or the first results of Google's image search, if Wikipedia does not provide images, instead of the images of Oxford building dataset. We used only one image for each of the eleven objects. Therefore, the image database 1 was rather small. This was used for the first experiment. In the second experiment, we added 49 new objects to the image database 1, and compared the results again.

Table 1 shows the results of the experiments. The first row in Table 1 indicates the result when the image database (Oxford DB) contains only 11 buildings (objects) of Oxford building dataset. WTA means the known Winner-Take-All approach compared to the method of the present invention. The "similarity score+locality score+context score" means the result when the third way is applied as the "resulting score" according to the present invention. The second row indicates the result when data of 49 unrelated objects are added to the image database 1. The left on the second row is the same as described previously, wherein the left row indicates the result when the first way or the second way is applied as the "resulting score" according to the present invention. Specifically, the "similarity score" is the result of the first way using only the similarity score of PCA-SIFT feature, and the "similarity score+locality score" is the result of the second way using the locality score according to the clustering, in addition to the similarity score of PCA-SIFT feature. The "similarity score+locality score+context score" is the result of the third way using the context score in addition to the similarity score and the locality score.

TABLE 1

| | Oxford DB | | Oxford DB + 49 objects | | | |
|---|---|---|---|---|---|---|
| | WTA | Present invention | WTA | Present invention | Similarity score | Similarity score + locality score |
| 1st | 47% | 65% | 4% | 64% | 45% | 60% |
| Top 10 | 99% | 96% | 77% | 92% | 79% | 90% |
| Failure | 1% | 4% | 23% | 8% | 21% | 10% |

The number of the query images 3 used in the present experiment was 272. Each of 272 query images 3 was obtained under varying angle, position, size, and lighting conditions. The first line shows how many correct recognitions are ranked at the $1^{st}$ place. The second line shows the ratio (cumulative percentage of correct answers within top 10) of the correct objects within the top 10.

When the image database 1 is not extended (the first row in Table 1), the method according to the present invention ("similarity score+locality score+context score") and the comparative method (WTA) both provide good performance. The comparative method (WTA) is only slightly better than the method according to the present invention ("similarity score+locality score+context score") concerning the top 10.

However, after the Oxford DB is extended, and 49 new unrelated objects are added (Oxford DB+49 objects), the percentage of correct answers dropped dramatically in the comparative method (WTA) as shown in the left of the second row in Table 1. On the other hand, the percentage of correct answers did not drop so much in the method according to the present invention ("similarity score+locality score+context score"). The main reason for the significant drop in the comparative method (WTA) is the objects added to the image database 1. Since the newly added object holds much more local features than the others, many votes are casted for this object, and this object is erroneously outputted. This is a problem caused in the simple WTA, because the normalization of the votes is not executed in the WTA.

Next, how much result was obtained for each way was evaluated in order to confirm the effective difference in the resulting score s among the respective ways in the method of the present invention. The result is shown on the right of the second row in Table 1. It is found that the individual similarity score (row of similarity score) of the PCA-SIFT features representing the first way enhanced the performance for the $1^{st}$ ranked results, compared to the comparative method (WTA). On the other hand, the results for the top 10 were not enhanced so much. As shown on the row indicating the second way of "similarity score+locality score", the $1^{st}$ ranked result and the results placed on top 10 were both enhanced by adding the locality information, i.e., the locality score, using the imaginary reference point. The third way ("similarity score locality score+context score" on the second row of "Oxford DB+49 objects" in Table 1) shows that the context score according to the shape context is added. It is found that the accuracy is further enhanced with this way, although the rank of the object does not change so much due to the addition of the context score according to the shape context.

Various modifications are possible for the present invention, in addition to the above-mentioned embodiment. These modifications should not be considered as not belonging to the scope of the present invention. The present invention should include the equivalents of the claims and all modifications within the scope of the invention.

The present invention proposes a novel approach to reduce the influence of cluttered background in order to enhance accuracy in the object detection. Many conventional methods require some manual works in order to reduce the influence of the cluttered background, and have problems in applicability. On the other hand, the method of the present invention succeeds in automatically overcoming this problem. By using different strategies, each of which has a different ability, the method of the present invention clearly outperforms the WTA. The use of the shape context was not so effective for enhancing the performance, but the use of reference points was extremely effective. The order of the returned results of the method of the present invention is more meaningful, and can give the user a better hint about the content of an image.

EXPLANATION OF NUMERALS

1 Image database
3 Query image

What is claimed is:
1. A method of detecting an object through a retrieve of an image representing an object matched to an object represented by a query image from an image database that includes a plurality of reference images and is created by extracting a plurality of reference feature vectors from each reference image that represents an object, each of the reference feature vectors representing a feature of one of local areas in each reference image, and by storing the reference feature vectors in such a manner that each of the reference feature vectors is associated with the corresponding reference image and with an object ID that identifies the object represented by each reference image, the method comprising the steps of:

extracting a plurality of vectors from the query image as query feature vectors, each of the query feature vectors representing a feature of one of local areas in the query image;

comparing each query feature vector with each reference feature vector, and calculating a similarity score that is determined to have a greater value in case where the query feature vector and the reference feature vector are closer, in case where a local area from which the query feature vector is extracted is greater, and in case where a local area from which the reference feature vector is extracted is greater;

determining a reference feature vector which provides the highest similarity score as a similar vector for each query feature vector; and obtaining resulting scores through a predetermined calculation procedure according to the respective object IDs, each object ID being associated with the similar vector, and determining, as a detection result, at least one object that is specified by an object ID giving the highest resulting score, wherein each resulting score is calculated according to the following equation:

[Equation 1]

$$s = \frac{\sum s_f}{N_f} \quad (1)$$

wherein $s_f$ is the similarity score regarding the similar vector, and $N_f$ is a number of query feature vectors each of which matches to a reference feature vector originated from a reference image representing an object regarding the object ID and being stored in the image database out of the query feature vectors in the query image.

2. The method according to claim 1, wherein the similarity score is calculated according to the following equation:

[Equation 2]

$$s_f = \frac{w(f_q) \cdot w(f_d)}{d(f_q, f_d)} \quad (2)$$

wherein w(f) is a size of a local area from which a feature vector f is extracted, and $d(f_q, f_d)$ is the Euclidean distance between a query feature vector $f_q$ and a similar vector $f_d$ corresponding to the query feature vector $f_q$.

3. The method according to claim 1, wherein the image database further stores distances and orientations from a predetermined reference point with respect to respective stored images, the distances and orientations being associated with the corresponding reference feature vector extracted from the image, the method further comprising the steps of:

determining locations of imaginary reference points to the similar vectors for each similar vector by using the distance and orientation, which are stored as being associated with the corresponding reference feature vector;

determining a plurality of clusters by collecting the similar vectors, which have imaginary reference points close to one another, and with which the same object ID is associated; and obtaining a locality score, which represents a degree of similarity of each cluster obtained as a result of the step of determining clusters, through a predetermined process, wherein each resulting score is calculated according to the following equation instead of the equation (1):

[Equation 3]

$$s = \frac{\sum s_f}{N_f} \sqrt{\frac{\sum r_c}{N_C}} \quad (3)$$

wherein $r_c$ is the locality score, and Nc is a number of similar vectors belonging to each cluster.

4. The method according to claim 3, wherein the locality score $r_c$ is defined as the total number of the imaginary reference points included in each cluster.

5. The method according to claim 3, further comprising the steps of:

obtaining a shape context according to respective feature vectors by applying a procedure of a shape context that is defined as a histogram obtained by dividing a region around one feature vector into a plurality of sub-regions as bins, and counting a number of other feature vectors belonging to the respective bins, each of the other feature vectors being distributed around the feature vector, calculating a context score through a predetermined procedure by using the obtained shape context, and calculating the context score according to the query feature vector by applying the shape context to each query feature vector, wherein each resulting score is calculated according to the following equation instead of the equation (3):

[Equation 4]

$$s = \frac{\sum s_f}{N_f} \sqrt{\frac{\sum r_c}{N_C}} \sqrt{\sum u_{SC}} \quad (4)$$

wherein $u_{sc}$ is the context score.

6. The method according to claim 5, wherein the context score is defined as a length of a vector by coupling elements of respective representative vectors,

[Equation 6]

$$SC = \begin{pmatrix} v_{ix} \\ v_{iy} \\ \vdots \\ v_{mx} \\ v_{my} \end{pmatrix} \quad (6)$$

wherein the representative vector of each bin is determined by obtaining the sum of neighboring feature vectors, belonging to any one of the bins, for each bin, [Equation 5]

$$v_i = (v_{ix}, v_{iy}) \quad (5)$$

wherein m is defined as the number of bins in the shape context.

7. The method according to claim 2, wherein the image database further stores distances and orientations from a predetermined reference point with respect to respective stored images, the distances and orientations being associated with the corresponding reference feature vector extracted from the image, the method further comprising the steps of:

determining locations of imaginary reference points to the similar vectors for each similar vector by using the distance and orientation, which are stored as being associated with the corresponding reference feature vector;

determining a plurality of clusters by collecting the similar vectors, which have imaginary reference points close to one another, and with which the same object ID is associated; and obtaining a locality score, which represents a degree of similarity of each cluster obtained as a result of the step of determining clusters, through a predetermined process, wherein each resulting score is calculated according to the following equation instead of the equation (1):

[Equation 3]

$$s = \frac{\sum s_f}{N_f} \sqrt{\frac{\sum r_C}{N_C}} \quad (3)$$

wherein $r_c$ is the locality score, and Nc is a number of similar vectors belonging to each cluster.

8. The method according to claim 4, further comprising the steps of:

obtaining a shape context according to respective feature vectors by applying a procedure of a shape context that is defined as a histogram obtained by dividing a region around one feature vector into a plurality of sub-regions as bins, and counting a number of other feature vectors belonging to the respective bins, each of the other feature vectors being distributed around the feature vector, calculating a context score through a predetermined procedure by using the obtained shape context, and calculating the context score according to the query feature vector by applying the shape context to each query feature vector, wherein each resulting score is calculated according to the following equation instead of the equation (3):

[Equation 4]

$$s = \frac{\sum s_f}{N_f} \sqrt{\frac{\sum r_C}{N_C}} \sqrt{\sum u_{SC}} \quad (4)$$

wherein $u_{sc}$ is the context score.

* * * * *